(No Model.) 3 Sheets—Sheet 1.
J. A. WEYER.
GLASS FURNACE.
No. 452,462. Patented May 19, 1891.
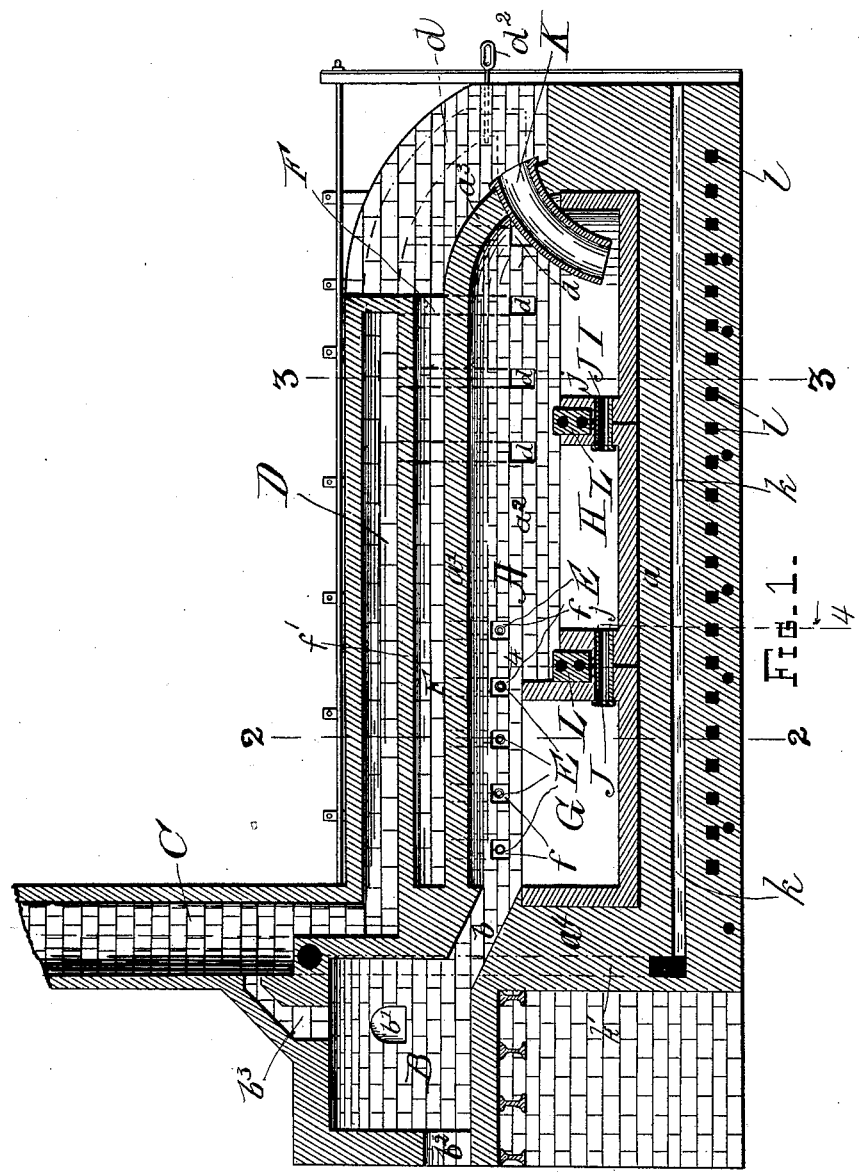
Witnesses
A. A. Wood
S. M. Wood
Inventor
Jules August Weyer,
By his Attorney
Albert A. Wood (No Model.)
J. A. WEYER.
GLASS FURNACE.
No. 452,462. Patented May 19, 1891.
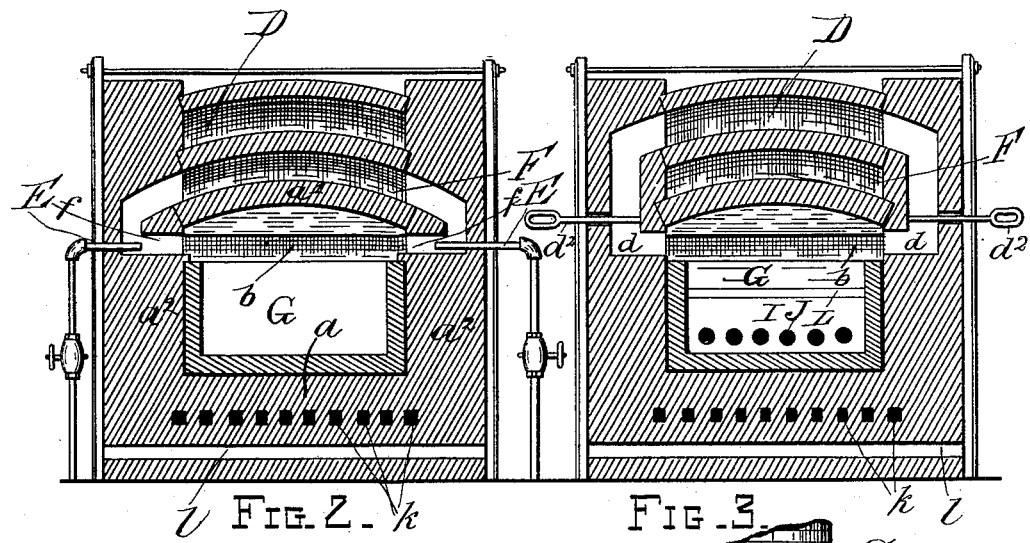
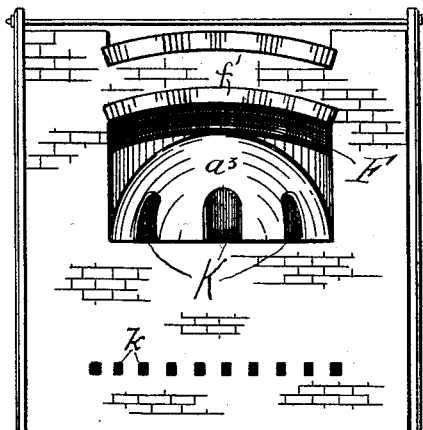
Fig. 4.
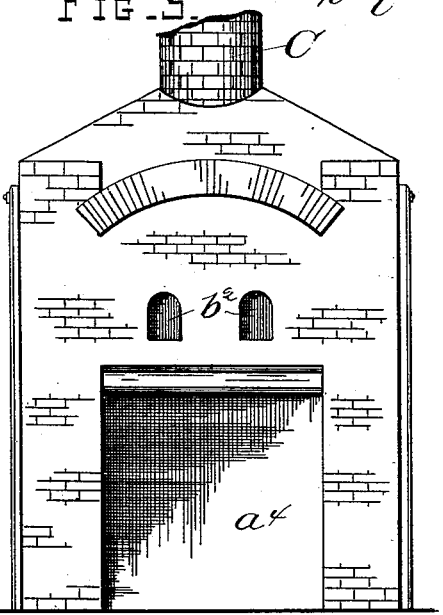
Fig. 5.

(No Model.)   J. A. WEYER.   3 Sheets—Sheet 3.
GLASS FURNACE.
No. 452,462.   Patented May 19, 1891.
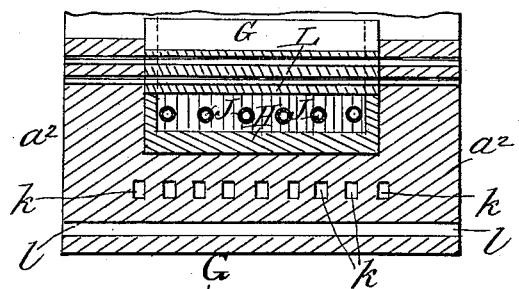
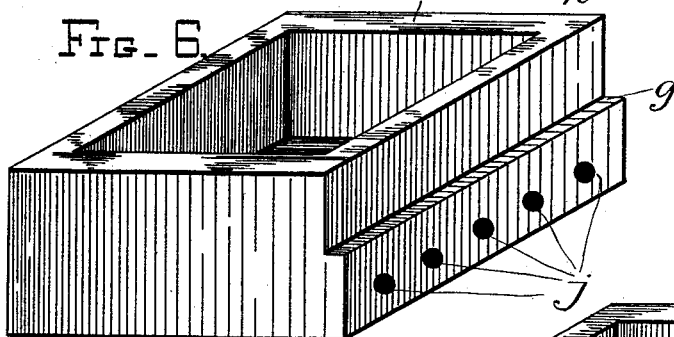
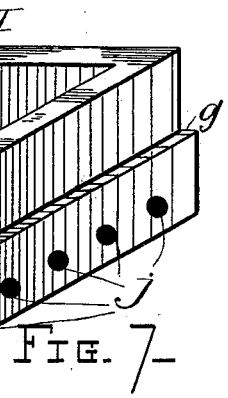
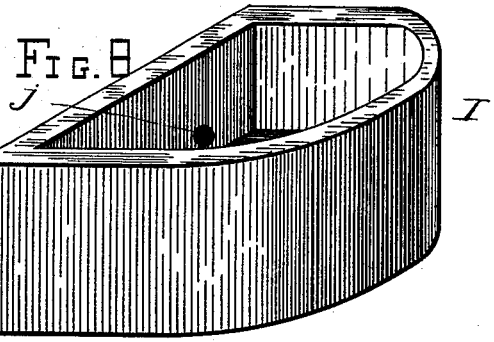
Witnesses
Inventor
Jules August Weyer.
By his Attorney
Albert A. Wood

UNITED STATES PATENT OFFICE.

JULES AUGUST WEYER, OF CELINA, OHIO; LEROY J. KING ADMINISTRATOR OF SAID JULES AUGUST WEYER, DECEASED.

GLASS-FURNACE.

SPECIFICATION forming part of Letters Patent No. 452,462, dated May 19, 1891.

Application filed July 3, 1890. Serial No. 357,671. (No model.)

*To all whom it may concern:*

Be it known that I, JULES AUGUST WEYER, a citizen of the United States, and a resident of Celina, in the county of Mercer and State of Ohio, have invented certain new and useful Improvements in Glass-Furnaces; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to furnaces, and more especially to that class of furnaces in which the material necessary is mixed and melted into glass and delivered to a place from which it can be conveniently gathered, the invention consisting in several novel details and additions to the construction heretofore employed, as will be hereinafter fully specified.

In the accompanying drawings, Figure 1 is a longitudinal vertical section of the device through the center thereof, showing the batch-preparing chamber, the melting crucibles and their interior connections, the boot, and the flues and gas-inlet. Fig. 2 is a vertical cross-section on the line 2 2, Fig. 1, showing the gas-jets and air-eduction flues, air-heating flue, the eduction-flue for the refuse products of consumption, and the reducing-pot. Fig. 3 is a vertical cross-section on line 3 3, Fig. 1, showing the refining-pot, the eduction-flue, and the short flues connecting the combustion-chamber therewith, dampers therein, and the flue wherein air is heated for supplying to the combustion-chamber. Fig. 4 is a front elevation of the device, showing three gathering-holes and the open end of the flue for heating air for combustion. Fig. 5 is a back elevation of the device, showing batch-charging doors and the chimney. Figs. 6, 7, and 8 are perspective views, respectively, of the reducing, melting, and refining pots. Fig. 9 is a transverse vertical section on the line 4 4 of Fig. 1.

In the figures like reference-marks indicate corresponding parts in all the views.

Furnaces for this purpose require frequent repairing owing to the intense heat required to melt the glass to the desired consistency for working, and as heretofore constructed necessitate an almost or entire tearing down of the furnace to make repairs. It is to obviate this great fault that has been my prime object in this present invention, as well as the improvement generally in the art, this invention being so constructed that repairs may be made on any portion thereof without disturbing contiguous construction, and the parts made more durable, and the glass produced of better comparative quality, and the action of each pot continues, the details of all of which are hereinafter fully specified.

The walls and floor of the furnace are traversed by flues for the purpose of keeping the same cool by a circulation of air therein. The combustion-chamber A is formed by a floor and crown $a$ and $a'$, respectively, and sides $a^2$, and has ends $a^3$ and $a^4$, front and back, respectively. Through the wall $a^3$ is a flue or opening $b$, which communicates with the batch heating and mixing chamber B, into which is thrown the mixed batch by way of the door $b'$, stirring-holes $b^2$ being provided and communication being had with the smoke-stack by means of the flue $b^3$, extending into said stack C from the chamber B. The inclination of the flue $b$ causes the batch to flow freely into the pot G in case it should become fluid or partially so. By means of this construction the batch can be heated and the gases evolved before it is passed into the melting and refining pots, and this will be done in a position in which the batch may be stirred and all the gases of whatever nature eliminated from the mass. Eduction-flues $d$, Figs. 1 and 3, pass from the chamber A into the main flue D, which connects with the chimney C. Dampers $d^2$ are supplied to regulate draft.

Air is supplied to the gas-jets E by means of the flues $f$, which connect with the heating-flue F, extending between the crown $a'$ and the wall $f'$, so that heat is conveyed from the chamber A and flue D into the air circulating through said flue after entering at its open end, as shown in Fig. 1, being drawn in by the current of gas issuing from the pipes E in the flues $f$, as best shown in Figs. 1 and 2, the pipes E having on their ends jets or burners of the desired size and form to govern the direction the gas takes on its introduction into the combustion-chamber A and valves to govern its quantity. As many of these pipes and their corresponding air-flues *f* may be employed as desired; but the principal heat should be applied to the reducing-pot G of the series of pots G, H, and I, constructed and arranged after the manner which will now be described. The reducing-pot G receives the batch after it is heated in the chamber B by way of the flue *b*, and should be sufficiently deep to hold the batch in its granular form, although it generally comes from the chamber B partially melted in form, and is thoroughly reduced in the pot G to a stiff consistency, the material melted, and hence in best condition, settling to the bottom and passing into the next pot H through the ducts J between said pots G and H, in which pot H it is further heated, the clearest and hottest glass settling and passing through the ducts J into the pot I, where it is further refined and gathered from the lower portion through the boot K, which is curved and extends from near the bottom of the pot I through the front $a^3$. There may be several of these boots in the one pot I, all being exactly alike and operating to allow the gathering of the glass without allowing the influx of cold air or the eflux of heat, &c., into or from the combustion-chamber A. The pots G, H, and I are formed substantially as shown in Figs. 6, 7, and 8, respectively, and are made of material of sufficiently refractory quality, the pots G and I having offsets *g* on the side next the pot H, and said pot H has said offsets *g* on the sides, by reason of which a rectangular space is left at the tops between each pot when assembled, into which is fitted a refractory tile L, which is perforated longitudinally and has connection exteriorly of the furnace for the admission of air, and extends somewhat above the tops of the pots, so as to form a fire-bridge and protect the tops of the pots at that point, where they would otherwise receive great heat. To remove a pot it is only necessary to remove this tile L and take the pot out, setting a new one in its place. In each of the openings *j* of the pots is placed a lining or bushing J of refractory material, forming a duct for the passage of glass from one pot to the next.

Flues *l* and *k* traverse the bottom of the furnace, the former passing transversely through and having exterior openings at both ends. The latter pass from exterior openings in the front to flues *k'*, extending upward through the back to the chimney.

Having thus described my invention, what I claim as new, and desire to secure by Letters Patent, is—

1. In a furnace, the combination of the chamber B, the combustion-chamber A, the melting-pots placed in the said combustion-chamber, the inclined passage *b*, leading from the chamber B to the pots, the tiles L, seated in recesses formed between the pots and having flues passing longitudinally through them and connected with flues leading through the walls to the exterior of the furnace, and the ducts J, placed in coincident apertures passing through the bottoms of the adjacent sides of the pots, substantially as and for the purpose specified.

2. In a furnace, the combination of the combustion-chamber, the communicating pots placed in said chamber, the flue F, formed over the combustion-chamber and having an exterior opening, the flue D, formed over the flue F and leading to the chimney, the flues *f*, leading from the flue F to the combustion-chamber, the gas-jets E, entering the lower ends of the flues *f*, and the flues *d*, leading from the combustion-chamber to the flue D, substantially as and for the purpose specified.
In testimony whereof I hereunto affix my signature in presence of two witnesses.

JULES AUGUST WEYER.

Witnesses:
 JOHN W. JACOBS,
 S. D. JOHNSON.